(12) United States Patent
Zhu et al.

(10) Patent No.: US 11,113,031 B2
(45) Date of Patent: Sep. 7, 2021

(54) SYSTEMS AND METHODS FOR LOADING PROJECT DATA

(71) Applicant: VISA INTERNATIONAL SERVICE ASSOCIATION, San Francisco, CA (US)

(72) Inventors: Sue Zhu, Bellevue, WA (US); Adam Conway, Bellevue, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/156,707

(22) Filed: Oct. 10, 2018

(65) Prior Publication Data

US 2020/0117428 A1    Apr. 16, 2020

(51) Int. Cl.
*G06F 8/20* (2018.01)
*G06F 8/73* (2018.01)

(52) U.S. Cl.
CPC . *G06F 8/20* (2013.01); *G06F 8/73* (2013.01)

(58) Field of Classification Search
CPC .................. G06F 8/20; G06F 8/73; G06F 8/70
See application file for complete search history.

(56) References Cited

U.S. PATENT DOCUMENTS

| | | | | |
|---|---|---|---|---|
| 5,878,262 A * | 3/1999 | Shoumura | ................. | G06F 8/20 717/164 |
| 7,757,212 B2 * | 7/2010 | Wagner | .................... | G06F 8/71 717/101 |
| 9,323,644 B1 * | 4/2016 | Hale | .................... | G06F 16/2237 |
| 9,678,719 B1 * | 6/2017 | Frenkel | ....................... | G06F 8/20 |
| 9,785,421 B1 * | 10/2017 | Neatherway | .............. | G06F 8/77 |
| 2007/0294701 A1 * | 12/2007 | Banavar | .................... | G06F 8/20 718/104 |
| 2011/0083167 A1 * | 4/2011 | Carpenter | ................. | G06F 8/36 726/4 |
| 2011/0231836 A1 * | 9/2011 | Wookey | .................. | G06F 8/658 717/174 |
| 2013/0227517 A1 * | 8/2013 | Fox | ........................... | G06F 9/44 717/101 |
| 2014/0068558 A1 * | 3/2014 | Mowatt | ..................... | G06F 8/71 717/120 |
| 2015/0261525 A1 * | 9/2015 | Kwon | ....................... | G06F 8/74 717/121 |
| 2017/0090876 A1 * | 3/2017 | Hale | .................... | G06F 16/2246 |

* cited by examiner

*Primary Examiner* — Wei Y Zhen
*Assistant Examiner* — Brahim Bourzik
(74) *Attorney, Agent, or Firm* — Loeb & Loeb, LLP

(57) ABSTRACT

A method of loading project data comprising identifying project files with a project ID. The method includes determining a secondary project file is referenced in a primary project file. The method includes loading the project ID of the secondary and primary project files into a reference table. The primary project file project ID and the secondary project file project ID referenced in the respective primary project file are associated with one another in the reference table. The method includes receiving a query for the primary project files referencing a queried secondary project file. The method includes determining the project IDs of the primary project files in the reference associated with the project ID of the queried secondary project file. The method includes providing a results table including the primary project file project IDs associated with the queried secondary project file project ID in the reference table.

14 Claims, 6 Drawing Sheets

200

202  204  206

| ID | ProjectName | ProjectLocation |
|---|---|---|
| 1 | UserManager.cs | \SourceCode\Common\Services\ |
| 2 | ApiWebService.csproj | \SourceCode\Api\ApiWebService\ |
| 3 | Services.csproj | \SourceCode\Common\Services\ |
| 4 | Services.Test.csproj | \SourceCode\Common\Services.Test\ |
| 5 | WebServices.csproj | \SourceCode\Common\WebServices\ |
| 6 | BusinessLogic.csproj | \SourceCode\Common\BusinessLogic\ |
| 7 | Frontend.csproj | \SourceCode\merchant\Frontend\ |
| 8 | Merchant.csproj | \SourceCode\merchant\ |
| 9 | EndUser.csproj | \SourceCode\EndUser\WebService\ |
| 10 | BusinessLogic.Test.csproj | \SourceCode\Common\BusinessLogic.Test\ |
| 11 | BatchProcessor.csproj | \SourceCode\Batch\processor\ |
| 12 | Frontend.Test.csproj | \SourceCode\merchant\Frontend.Test\ |
| 13 | Frontend.csproj | \SourceCode\Fraud\Frontend\ |
| 14 | Fraud.csproj | \SourceCode\Fraud\ |
| 15 | Frontend.Test.csproj | \SourceCode\Fraud\Frontend.Test\ |
| * | NULL | NULL |

| ProjectID | ReferencedIn |
|---|---|
| 1 | 3 |
| 3 | 2 |
| 3 | 4 |
| 3 | 5 |
| 3 | 6 |
| 3 | 7 |
| 3 | 8 |
| 3 | 9 |
| 6 | 9 |
| 6 | 10 |
| 7 | 11 |
| 7 | 12 |
| 7 | 13 |
| 7 | 14 |
| 7 | 15 |
| NULL | NULL |

| | ID | ProjectName | ProjectLocation | ReferencedInID | ReferencedInProjectName | ReferencedInProjectLocation |
|---|---|---|---|---|---|---|
| 1 | 3 | Services.csproj | \SourceCode\Common\Services\ | | | |
| 2 | 3 | Services.csproj | \SourceCode\Common\Services\ | 2 | ApiWebService.csproj | \SourceCode\Api\ApiWebService\ |
| 3 | 3 | Services.csproj | \SourceCode\Common\Services\ | 4 | Services.Test.csproj | \SourceCode\Common\Services.Test\ |
| 4 | 3 | Services.csproj | \SourceCode\Common\Services\ | 5 | WebServices.csproj | \SourceCode\Common\WebServices\ |
| 5 | 3 | Services.csproj | \SourceCode\Common\Services\ | 6 | BusinessLogic.csproj | \SourceCode\Common\BusinessLogic\ |
| 6 | 3 | Services.csproj | \SourceCode\Common\Services\ | 7 | Frontend.csproj | \SourceCode\merchant\Frontend\ |
| 7 | 3 | Services.csproj | \SourceCode\Common\Services\ | 8 | Merchant.csproj | \SourceCode\merchant\ |
| | 3 | Services.csproj | \SourceCode\Common\Services\ | 9 | EndUser.csproj | \SourceCode\EndUser\WebService\ |

FIG. 4

SYSTEMS AND METHODS FOR LOADING PROJECT DATA

FIELD OF THE INVENTION

The invention relates to systems and methods for loading project data into a database.

BACKGROUND

Source code for projects or files for software development created through integrated development environments (IDEs) may include references to other project files or components. From time to time, it may be desirable to update source code in certain project files, or update the source code of the project files referenced in other code. Upon such updates, it may be desirable to deploy not only the updated projects, but also any projects in which the updated project has been referenced. Traditionally, it has been difficult and inefficient to determine the other project files in which an updated project has been referenced in order to ensure proper deployment and updating.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 2 is an embodiment of a ProjectInfo table of the project data loading system of FIG. 1;

FIG. 3 is an embodiment of a ProjectReference table of the project data loading system of FIG. 1;

FIG. 4 is an embodiment of a Results table of the project data loading system of FIG. 1;

Figure 1:
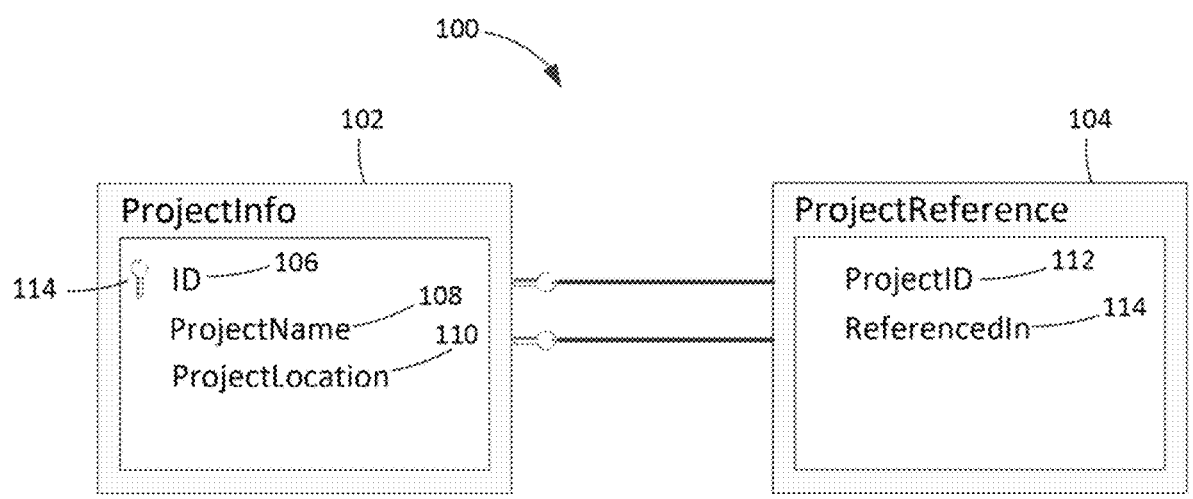
FIG. 1 is an illustration of a general database structure for a project data loading system as shown and described herein.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In embodiments, the disclosure describes systems and methods for loading project data into a reference database such that references to other project files may be efficiently retrieved. In some embodiments, the system may include a user interface to receive queries and provide query results.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Programmers often use a software application such as an integrated development environment (IDE) for software development. Various types of IDEs are available on the market with differing features and uses. Just some examples of currently available IDEs on the market are Microsoft® Visual Studio®, SharpDevelop, NetBeans®, Eclipse, Lazarus, etc., but other current or future IDEs are also contemplated. Users may use some IDEs, such as Microsoft® Visual Studio®, to develop computer programs, websites, web apps, web services, mobile apps, etc. Some IDEs may themselves include or support additional software development platforms and visual designers that may aid in the development of applications, such as forms designers, web designers/developers, class designers, data designers, mapping designers, etc. Additionally, some IDEs may also include text editors in which a programmer may edit or write code, such as Notepad, NotePad++, etc.

In some embodiments, programs or other application that a user may code using an IDE may be saved as or referred to generally as discrete projects saved as project files. For instance, a user may use an IDE to develop a project file that contains code or other components that make up a program or other application. In some embodiments, the project file may itself contain references to other files or programs. In some embodiments, those reference files or programs may be other projects or components. In some embodiments, a component referenced in a project may provide reusable code, sometimes in the form of objects.

At a high level, some embodiments of the disclosure may provide a solution that allows users to quickly and efficiently determine which components or other programs are referenced in project files. For example, a project file may contain references to one or more other project files or components. The components themselves may, from time to time, be edited to include new features, to fix software bugs, to change parameters, etc. In some IDEs, the project files referencing those components may not execute the updated component when the component itself has been altered. In some embodiments, the project file may incorporate the component as the component existed prior to the update, or may simply not function properly because the component no longer functions as expected. In such embodiments, it may be advantageous to deploy not only the updated component, but to additionally deploy each of the project files in which the updated component may be referenced.

Traditionally, determining which project files contain references to which components may have involved painstakingly checking each project file to individually assess which other project files or components are referenced therein. In some instances, the project file may itself be referenced in other project files, so any update to a reference in the original project file may affect an entire hierarchy of project files. Accordingly, each of these project files in the hierarchy may also need deployment in order to reflect the updated component or project file. In some embodiments of the disclosure, a project data loading system may include initially determining which project files or components are referenced in each project file, loading project file identifiers into a database along with identifiers for their corresponding references, and providing efficient access to which project files reference which components. In such embodiments, the project data loading system may enable increased computer efficiencies at least because, once a database is initially loaded with project references, the database may be re-used and shared among users who would otherwise need to re-run the initial determination of references. In some cases, checking which projects are cited in which other project files may include full source code searches of the entire code base many times over, which is extremely inefficient and very CPU intensive. Because the disclosed project data loading system includes loading the relevant reference information only once or less frequently, the CPU workload for each computer and overall may be significantly reduced.

One exemplary embodiment of a general database structure 100 for the project data loading system is shown in FIG. 1. The structure 100 may include a ProjectInfo table 102 and a ProjectReference table 104. The ProjectInfo table 102 may include project information, such as a project identifier ("ID") 106, a name of the project ("ProjectName") 108, a location where the project file may be stored on a computer, network, or cloud ("ProjectLocation") 110, etc. In some embodiments, the ProjectReference table 104 may include information from the ProjectInfo table 102 that may be indicative of the project files in which another project file or component is referenced. For example, in the ProjectReference table 104, ProjectID 112 may represent the ID 106 of a project file or component, and ReferencedIn 114 may represent the ID 106 of another project file in which the ProjectID 112 project file is referenced. Although only one ReferencedIn 114 entry is shown in FIG. 1, it is contemplated that some ProjectIDs 112 may be referenced in more than one project file and, therefore, include additional corresponding ReferencedIn entries in the ProjectReference table 104. In some embodiments, the project file identifiers may each be a foreign key that may be linked to a primary key in the ProjectInfo table 102. In the embodiment illustrated in FIG. 1, ProjectID 112 and ReferencedIn 114 may be foreign keys linked to primary key, or the ID 106, in respective project files. It should be understood that, in some embodiments, the primary key (e.g., the ID) for the ProjectID 112 in the ProjectReference table 104 may be from a different entry in the ProjectInfo table 102 between the ProjectID and the ReferencedIn 114 entries. For example, the ProjectID 112 in the ProjectReference table 104 may have a primary key (e.g., an ID) in a first entry in the ProjectInfo table 102, and the ReferencedIn 114 entry may have a primary key (e.g., an ID) in a second entry in the ProjectInfo table 102. However, it should be understood that the databases may be arranged in other suitable ways.

FIG. 2 illustrates an exemplary embodiment of a ProjectInfo table 200, such as depicted and described in FIG. 1. In the illustrated embodiment, the ProjectInfo table 200 includes an ID column 202, a ProjectName column 204, and a ProjectLocation column 206. The ID column 202 may include numerals representing project identifiers. Although project identifiers 1-15 are illustrated in FIG. 2, it should be understood that different embodiments may include other numbers of project identifiers. In the illustrated embodiment, each project identifier in the ID column 202 is represented in its own corresponding row of the ProjectInfo table 200. Accordingly, the name of the project corresponding to each project identifier may be in the ProjectName 204 in a row corresponding to the appropriate project identifier, and the location where the project file is saved may be in the ProjectLocation column 206 in a row corresponding to the appropriate project name and project identifier. For example, in the illustrated embodiment, the project file with a project identifier of the numeral "1" may have the project name "UserManager.cs" and the project file may be saved in the location "\SourceCode\Common\Services\". Of course, one of ordinary skill in the art would understand that the representations of project IDs, project names, and project locations may vary widely by embodiment, by computer file structure, by IDE, etc.

FIG. 3 illustrates an exemplary embodiment of a ProjectReference table 300, such as depicted and described in reference to FIG. 1. In the illustrated embodiment, the ProjectReference table 300 may include a ProjectID column 302 and a ReferencedIn column 304. As described with reference to FIG. 1, the ProjectID column 302 may include rows with numerals representing a primary project file or component, and the ReferencedIn column 304 may include rows with numerals representing at least one secondary project file in which the corresponding (i.e., same row) primary project file or component is referenced. For example, in FIG. 3, the project file represented by the primary project file with project identifier numeral "1" in the ProjectID column 302 is shown as referenced in the secondary project file with project identifier numeral "3" in the ReferencedIn column 304. Similarly, the project file represented by the primary project file with project identifier numeral "3" in the ProjectID column 302 is shown as referenced in the secondary project files with project identifier numerals "2," "4," "5," "6," "7," "8," and "9." In some embodiments, the illustrated relationships in ProjectReference table 300 may indicate that the project file with the project identifier "1" is referenced in the project file with the project identifier "3," while the same project file with project identifier "3" is referenced in six different project files, i.e., those with project identifiers "2," "4," "5," "6," "7," "8," and "9." One of skill in the art will appreciate that the tables shown in the figures may be structured differently while still conveying the same or similar information about where project files are referenced.

In one exemplary embodiment, the ProjectInfo table 200 and the ProjectReference table 300 may be created using the following programing code. Although the code listed herein is in Structured Query Language (SQL), it will be appreciated by those skilled in the art that other codes using varying computer programming languages may be used to similar ends:

```
ALTER TABLE [dbo].[ProjectReference] WITH CHECK ADD CONSTRAINT [FK_ProjectReference_ProjectInfo] FOREIGN KEY([ProjectID])
REFERENCES [dbo].[ProjectInfo] ([ID])
GO ALTER TABLE [dbo].[ProjectReference] CHECK CONSTRAINT [FK_ProjectReference_ProjectInfo]
GO ALTER TABLE [dbo].[ProjectReference] WITH CHECK ADD CONSTRAINT [FK_ProjectReference_ProjectInfo1] FOREIGN KEY([ReferencedIn])
REFERENCES [dbo].[ProjectInfo] ([ID])
GO ALTER TABLE [dbo].[ProjectReference] CHECK CONSTRAINT [FK_ProjectReference_ProjectInfo1]
GO
```

In this example, the SQL code may set ID 106 in the ProjectInfo table 102 as the primary key (i.e., reference) for the foreign key of ProjectID 112 and ReferencedIn 114 in the ProjectReference table 104. Once compiled, in some embodiments, the project identifiers from all the project files may be loaded together into the ProjectReference table as exemplified in FIG. 3.

In the example of the ProjectInfo table 200 in FIG. 2 and the ProjectReference table 300 in FIG. 3, once the fields for these tables are populated as described above, a query may be run to determine which other project files a particular project file has been referenced in. In some embodiments, the query may produce a results table that may include, for example, the project name, the project file location, the project identifier of the other project files in which the queried project file is referenced, and the name and location of the other project file in which the queried project file is referenced. In one embodiment, an example of SQL code that may produce such a results table may include the following:

```
SELECT  ProjectInfo.ID, ProjectInfo.ProjectName, ProjectInfo.ProjectLocation,
        PI1.ID AS ReferencedInID, PI1.ProjectName AS ReferencedInProjectName,
        PI1.ProjectLocation AS ReferencedInProjectLocation
FROM    ProjectInfo INNER JOIN
        ProjectReference ON ProjectInfo.ID = ProjectReference.Project.ID INNER JOIN
        ProjectInfo AS PI1 ON ProjectReference.ReferencedIn = PI1.ID
WHERE   (ProjectInfo.ProjectName = 'Services.csproj')
```

Using the example values from FIGS. 2 and 3, FIG. 4 shows an embodiment of a Results table 400 that the SQL code (or other suitable code) may produce. For example, the "WHERE" statement in the SQL code above may indicated that the query is to provide information the project files in which "Services.csproj" may be referenced. Referring to the Results table 400 in FIG. 4, all of the entries under the ProjectName column 404 indicate the above-recited project name. Referring to the ID column 402, the project identifier for the queried project may be "3." The ProjectLocation column 406 may indicate the file location of the queried project file. The ReferencedInID column 408 may show the project identifier for project files in which the queried project is referenced. In this example, the Results table 400 in FIG. 4 reflects the same results as stored in the ProjectReference table 300 in FIG. 3; that is, that the queried project file with project identifier "3" is referenced in the project files with project identifier "2," "4," "5," "6," "7," "8," and "9." The ReferencedInProjectName column 410 may show the project names of the project files in which the queried project file is referenced, and the ReferencedInProjectLocation 412 may show the corresponding file locations of those project files. Of course, one skilled in the art would understand that many variations or combinations of the information provided in FIG. 4 may be used to provide similar information. Thus, in an exemplary embodiment, running the SQL code or variations of the code to draw results from the initially provided database of reference information may enable a user to quickly and efficiently determine which project files reference a particular project file.

Figure 5:
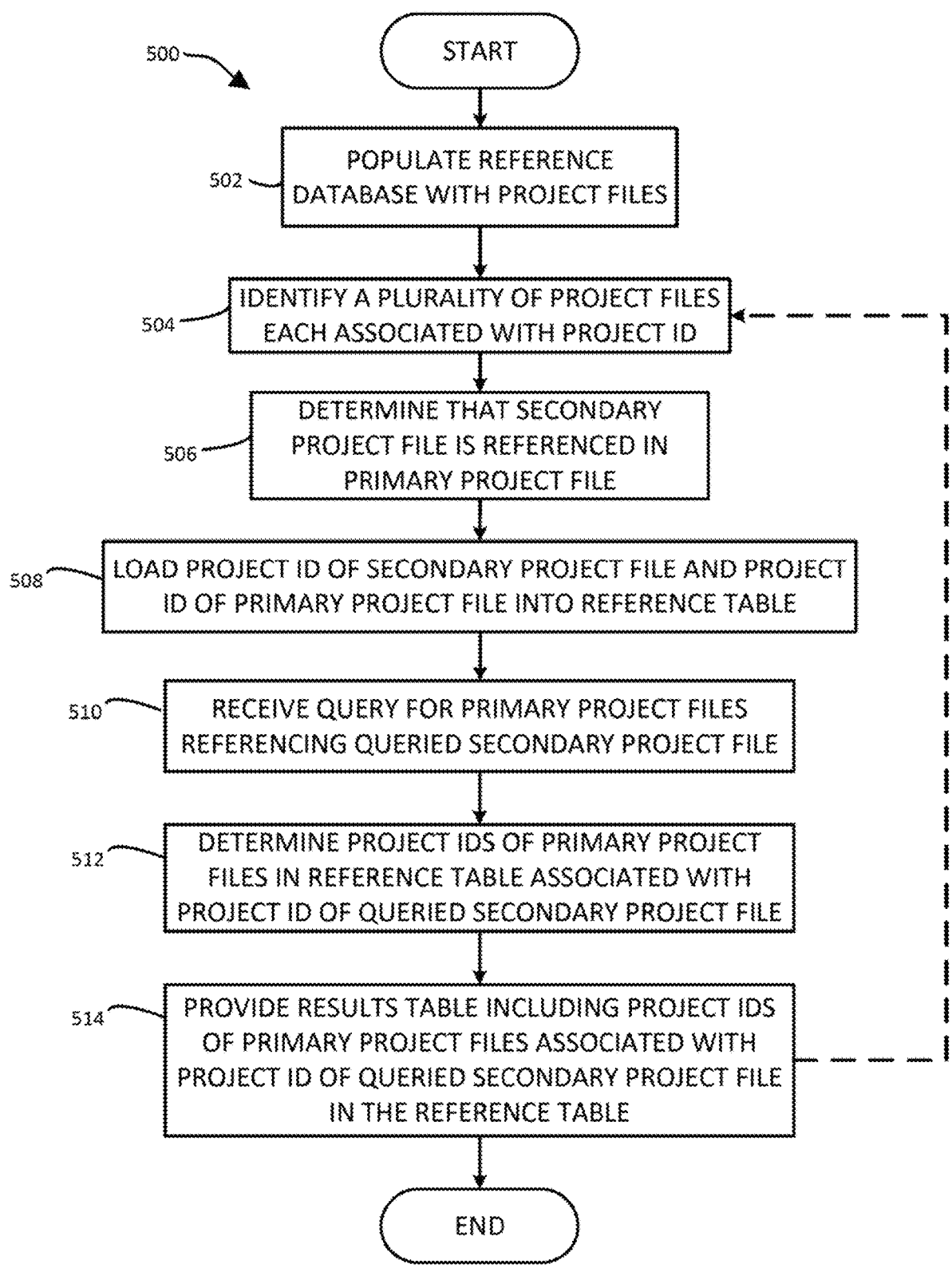
FIG. 5 is a flow chart of an embodiment of a method for using the project data loading system as shown and described herein.

FIG. 5 illustrates an exemplary a method 500 of using the project data loading system. In some embodiments, the method 500 may include, at 502, populating a database with reference information. As described above, the initial determination of which project files or components are referenced in other project files may only be completed once or only periodically to refresh the database. Once the reference database has been populated with reference information from project files, the remaining steps of the method 500 may be performed much more efficiently based on the initial reference database population. In some embodiments, populating the initial reference database may be done by conducting manual searches of the relevant project file source code, or may be done automatically with software. In either case, once the reference database has been populated with the relevant information, the method 500 may include, at 504, identifying a plurality of project files that may each be associated with a project identifier (i.e., project ID). In some embodiments, the project identifier may be a number, a name, a word, a set of alphanumeric characters, etc. At the 506, the method 500 may include determining that at least one secondary project file of the plurality of project files has been referenced in at least one primary project file of the plurality of project files. In some embodiments, the at least one secondary project file may be a project file that has been updated with new code or other components, and the at least one primary project file may be a project file that includes, in its own code or otherwise, at least one reference to the at least one secondary project file. At 508, the method 500 may include loading the project ID of the at least one secondary project file and the project ID of the at least one primary project file into a reference table, where the project ID of each of the at least one primary project file and the project ID of the secondary project file may be associated with one another. One exemplary embodiment of such a reference table is shown and described with reference to the ProjectReference table 300 in FIG. 3. In such an embodiment, the ProjectID column 302 may include rows of project IDs associated with the secondary project files, and the ReferencedIn column 304 may include project IDs of primary project files that include reference to the secondary reference files in the same row.

In some embodiments, the method 500 may include, at 510, receiving a query for the primary project files that may reference a queried secondary project file of the at least one secondary project files. The query may be formed through SQL structure as described above, or may be received through other suitable database querying tools. In some embodiments, the method 500 may include, at 512, responding to the query by determining the one or more project IDs of the at least one primary project file in the reference table that may be associated with the project IDs of the queried secondary project file. This determination may indicate that the queried secondary project file may be referenced in the respective at least one primary project file with which the respective project IDs are associated in the reference table. In some embodiments, the method 500 may include, at 512, determining the one or more project IDs of the at least one primary project file in the reference table that may be associated with the project ID of the queried secondary project file. In such embodiments, the project IDs associated with the primary project files that are associated with the project ID of the queried secondary project file may indicate that the queried secondary project file may be referenced in the respective associated one or more primary project files. In such embodiments, the project IDs of respective primary and secondary project files may be associated with one another if the respective project IDs are listed in the same row as one another in the reference table, such as illustrated in FIG. 3. Some embodiments, of the method 500 may, at 514, include providing a results table that may include the project ID of each of the at least one primary project file associated with the project ID of the queried secondary project file in the reference table. In such embodiments, the results table may include additional information about the queried secondary project file and the one or more primary project files in which the queried secondary project file is referenced. For example, in the Results table 400 illustrated in FIG. 4, additional information for the primary and secondary project files is included in the table, such as the project names and project locations. It is contemplated, however, that more or less information for the respective project files may be included in the results table.

Figure 6:
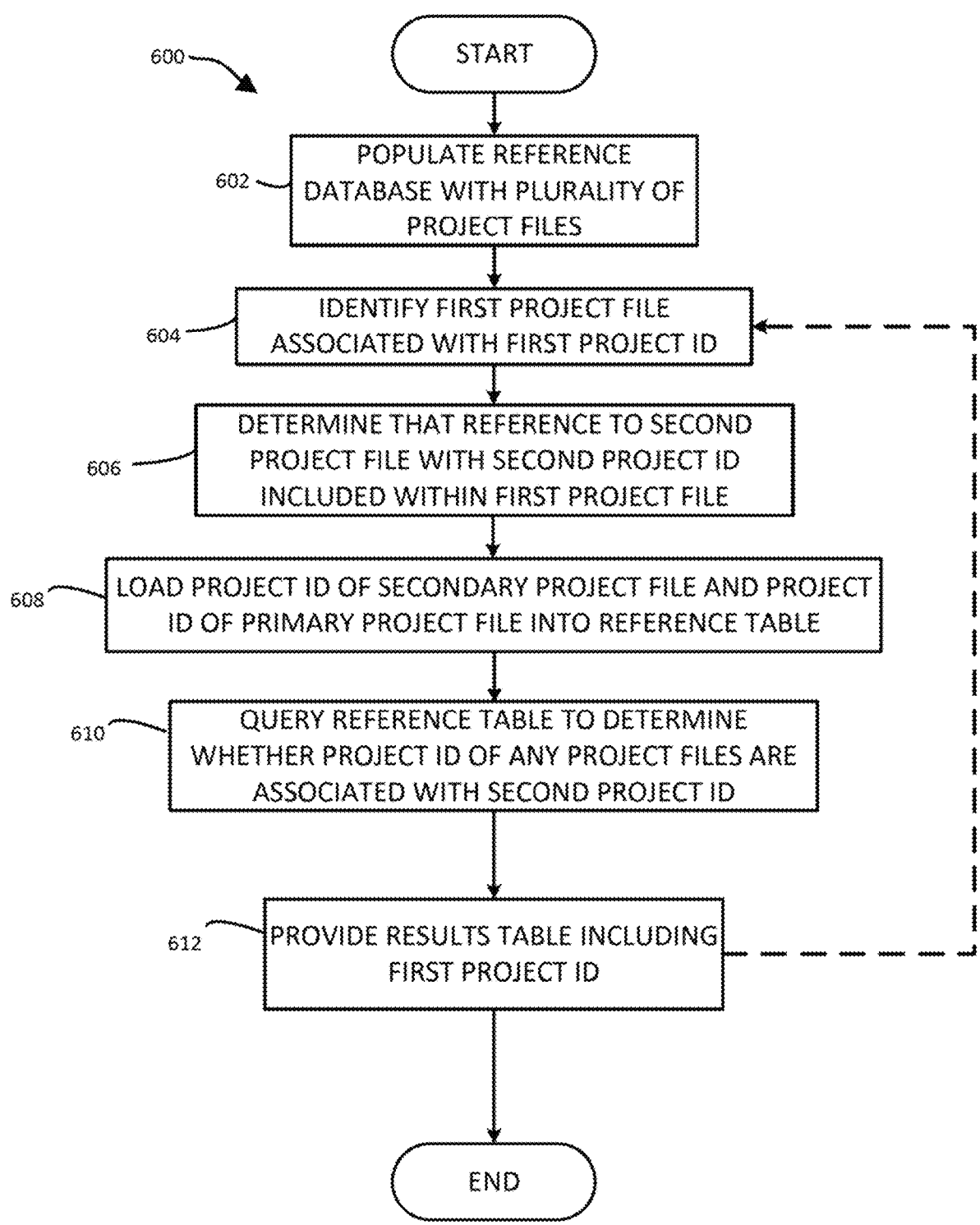
FIG. 6 is a flow chart of an embodiment of another method for using the project data loading system as shown and described herein.

FIG. 6 illustrates another embodiment of a method 600 for using the project data loading system. As above with method 500, the method 600 may include, at 602, populating a database with reference information using a suitable method for retrieving the reference information, the reference information including a plurality of project files. The method 600 may also include, at 604, identifying at least a first project file of the plurality of project files, the first project file being associated with a first project ID. The method 600 may include, at 606, determining that at least one reference to a second project file of the plurality of project files may be included within the at least one first project file, the second project file being associated with a second project ID. The method 600 may include, at 608, loading the first project ID and the second project ID into a reference table such that the first project ID may be associated with the second project ID. For example, as in the ProjectReference table 300 in FIG. 3, the first project ID may be included in the ReferencedIn column 304 and the associated second project ID may be included in the ProjectID column 302 in the same row as the associated first project ID. The method 600 may also include, at 610, querying the reference table to determine whether any project ID associated with any of the plurality of project files are associated with the second project ID. Upon receiving the query of the reference table, the method 600 may include providing, at 612, a results table including at least the first project ID. In some embodiments, such as in the Results table 400 in FIG. 4, the results table may include information in addition to the first project ID.

Another embodiment of a method of using the project data loading system may include identifying a plurality of project files each associated with a project ID. The method may also include identifying one or more references to another one of the plurality of project files included in at least one primary project file of the plurality of project files. In some embodiments, the one or more referenced project files may each be components of the at least one primary project file. The method may also include loading the project ID of the at least one primary project file and the project ID of each of the one or more referenced components into a reference table. In some embodiments, the project ID of each of the one or more referenced components may be associated with the project ID of the at least one primary project file in which the respective components may be referenced. The method may include receiving a query to determine whether a first of the one or more referenced components are associated with any of the primary project files in the reference table. Based on the query, the method may include providing a results table including the at least one primary project file.

Figure 7A:
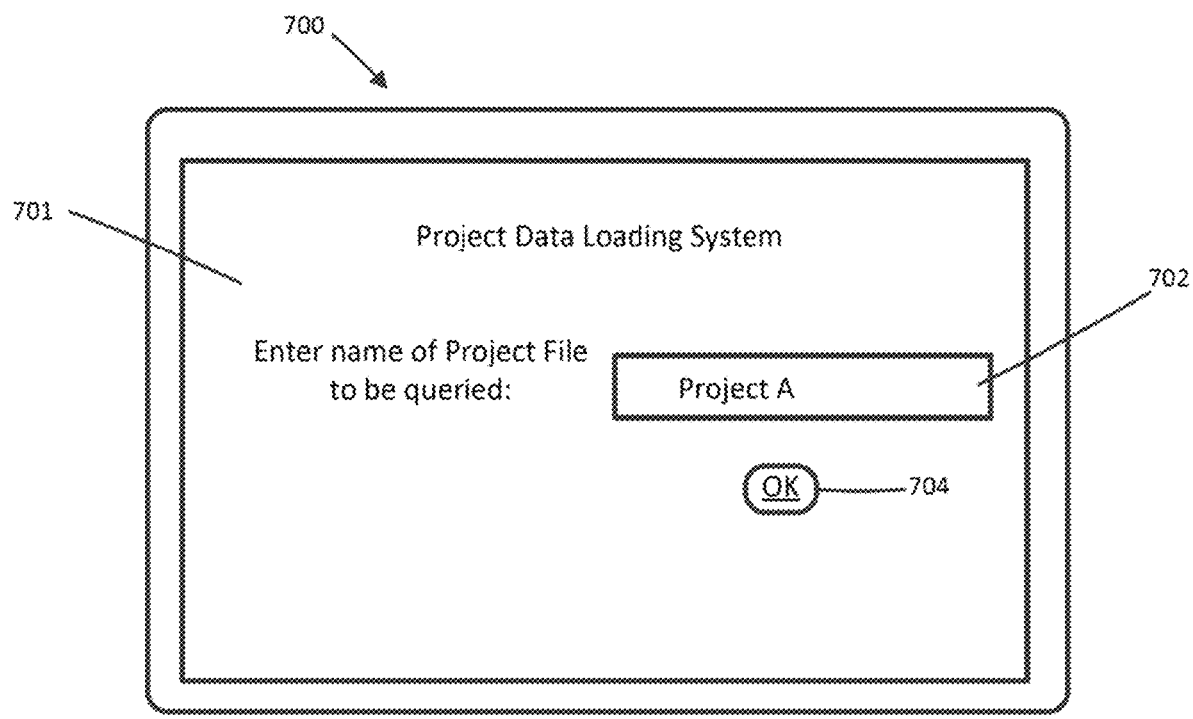
FIGS. 7A and 7B are an embodiment of a user interface of the project data loading system as shown and described herein.
Figure 7B:
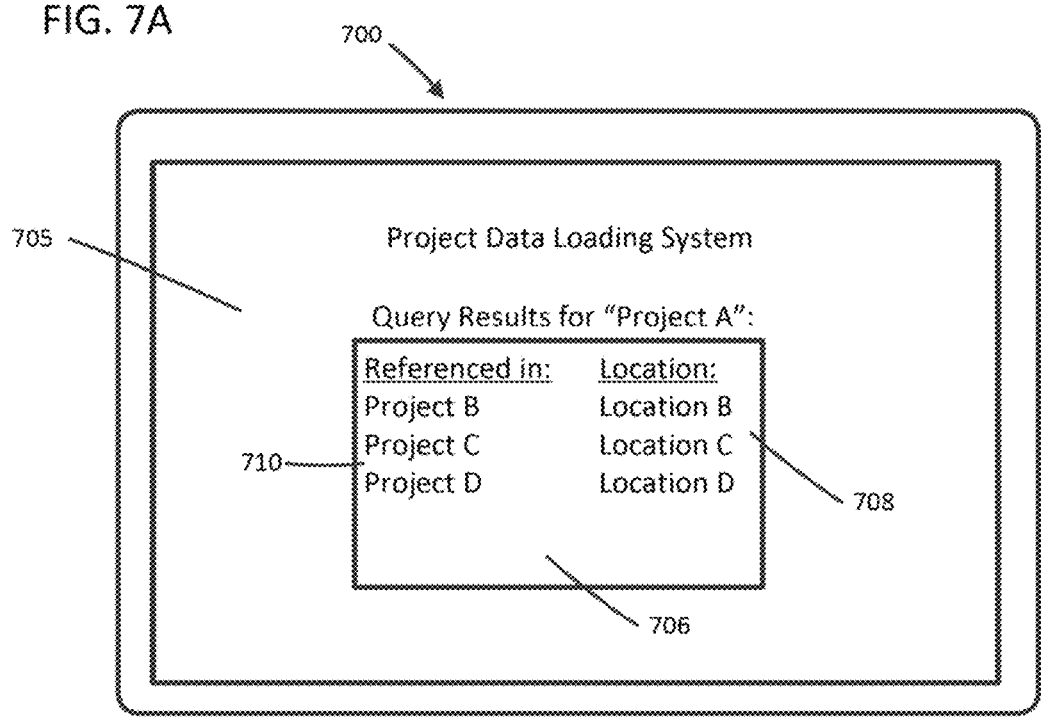

In some embodiments, the project data loading system may be implemented through SQL or other structured programing language commands delivered by a user. In some embodiments, however, the project data loading system may be implemented via an application that may include a user interface, such as that user interface 700 shown in FIGS. 7A and 7B. Those skilled in the art will appreciate that the user interface shown in FIGS. 7A and 7B is merely for exemplary and many user interface may be suitable to perform the disclosed systems and methods. User interface 700 may be displayed on any suitable computer screen, mobile device, etc., that has access to the reference database information described herein. In some embodiments, the access may be directly to information stored on the particular computer or network of computers. In some embodiments, it is contemplated that the reference information database may be accessed remotely via a digital communications network, such as the Internet.

Referring to FIG. 7A, in some embodiments, the project data loading system may have a user interface 700 may have a query pane 701 with a query entry box 702 into which a user may enter the name or other identifier for a project file to be queried. In some embodiments, the query entry box 702 may take entries of a project name, project identifier, project location, or any other suitable identifier to be queried. In the illustrated embodiment, a user has entered a query for a project file named "Project A." In some embodiments, the user interface may include an OK button 704 or other suitable indicator to initiate the query. FIG. 7B shows a results pane 705 of the user interface 700 that may show the results of the query of FIG. 7A. The user interface results pane 705 may include results window 706 that may display a table or other illustration of the query results. In the illustrated embodiment, the results window 706 may include a Referenced-in column 710 listing the names of the projects in which the queried project file may be referenced and a location column 708 may show the file location of the associated project files. In some embodiments, the results window 706 may display other information, such as project identifiers for the project files.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, system 10 and the methods described herein may be configured to provide real-time incentive information to service providers and execute near-immediate payout splits upon service completion. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A processor-implemented method of deploying updated computer software projects, the method comprising:
   identifying, via one or more processors, at least a first project file of a plurality of software project files, the first project file being associated with a first project ID;
   determining, via the one or more processors, that at least one reference to programing code of a second project file of the plurality of software project files is included within the at least one first project file, the second project file being associated with a second project ID;
   loading, via the one or more processors, the first project ID and the second project ID into a reference table such that the first project ID is associated with the second project ID in the reference table;
   providing, via the one or more processors, a graphical user interface with a field for receiving one or more user selections of queried project IDs associated with a project files that include updates to programming code;
   editing, via the one or more processors, programming code of the second project file so as to change a functionality of the second project file;
   receiving, via the field for receiving user selections of queried project IDs, a user selection of the secondary project ID for the second project file that includes edited programming code;
   in response to receiving the user selection of the secondary project ID, querying, via the one or more processors, the reference table to determine whether any project ID of any of the plurality of software project files is associated with the second project ID in the reference table and thus requires deployment to reflect the edited programming code of the second project file;
   in response to the query of the reference table, providing, via the one or more processors, a results table via the graphical user interface, the results table including at least the first project ID and a file location of the first project file; and based on the results table, deploying, via the one or more processors, the first project file in order to reflect, in the first project file, the edits to the programming code of the second project file associated with the second project ID.

2. The method of claim 1, wherein the results table includes a project name of each of the at least one primary project files and a project name of the queried secondary project file.

3. The method of claim 1, wherein the reference table includes a first column listing the project ID of each of the at least one secondary project file, and a second column listing the project ID of each of the at least one primary project file.

4. The method of claim 3, wherein the project ID of the at least one primary project file listed in the second column are in the same row as the project ID of the at least one secondary project file that is reference in the listed primary project file.

5. A processor-implemented method of deploying updated computer software projects, the method comprising:

identifying, via one or more processors, at least a first project file of a plurality of software project files, the first project file being associated with a first project ID;

periodically determining, via the one or more processors, that at least one reference to programming code of a second project file of the plurality of software project files is included within the at least one first project file, the second project file being associated with a second project ID;

periodically loading, via the one or more processors, the first project ID and the second project ID into a reference table such that the first project ID is associated with the second project ID in the reference table;

providing, via the one or more processors, a graphical user interface with a field for receiving one or more user selections of queried project IDs associated with a second project file that includes updates to the programming code;

editing, via the one or more processors, programming code of the second project file;

receiving, via the field for receiving user selections of queried project IDs, a user selection of the secondary project ID for the second project file that includes edited programming file code;

in response to receiving the user selection of the secondary project ID, querying, via the one or more processors, the reference table to determine whether any project ID of any of the plurality of software project files is associated with the second project ID in the reference table;

upon receiving the query of the reference table, providing, via the one or more processors, a results table via the graphical user interface, the results table including at least the first project ID and a file location of the first project file; and based on the results table, deploying, via the one or more processors, the first project file in order to reflect, in the first project file, the edits to the programming code of the second project file associated with the second project ID.

6. The method of claim 5, wherein the results table includes a project name of the first project file and a project name of the second project file.

7. The method of claim 5, wherein the reference table includes a first column listing the project ID of the second project file, and a second column listing the project ID of the first project file.

8. The method of claim 7, wherein the project ID of the first project file listed in the second column is in the same row as the project ID of the second project file that is reference in the listed first project file.

9. The method of claim 7, wherein at least one reference to a third project file of the plurality of software project files is included within the at least one first project file.

10. A processor-implemented method of deploying updated computer software projects, the method comprising:

identifying, via one or more processors, a plurality of software project files each associated with a project ID;

periodically identifying, via the one or more processors, one or more references to programming code of another one of the plurality of software project files included in at least one primary project file of the plurality of software project files, wherein the one or more referenced software project files are each software components of the at least one primary project file;

periodically loading, via the one or more processors, the project ID of the at least one primary project file and the project ID of each of the one or more referenced software components into a reference table, the project ID of each of the one or more referenced software components being associated in the reference table with the project ID of the at least one primary project file in which the respective software components are referenced;

providing, via the one or more processors, a graphical user interface configured to be displayed on a user computing device associated with a user, the graphical user interface including a field for receiving user selections of queried project IDs of software components of the one or more referenced software components that include updates to programming code;

editing, via the one or more processors, programming code of a software component of the one or more referenced software components to create an updated software component;

receiving, via the one or more processors, a user selection of the project ID associated with the updated software component, the user selection being received from the user computing device via the field for receiving user selections of queried project IDs in the graphical user interface;

in response to receiving the user selection of the project ID associated with the updated software component, querying, via the one or more processors, the reference table to determine whether the updated software component is associated in the reference table with any of the primary project files in the reference table and thus require deployment to reflect the edited programming code of the updated software component;

based on the results of the query, providing, via the one or more processors, a results table in the graphical user interface including the project ID and a file location of at least one primary project file found to be associated with the updated software component in the reference table; and based on the results table, deploying, via the one or more processors, each of the at least one primary project files included in the results table in order to reflect the edits to the programming code in the updated software component associated with the queried project ID.

11. The method of claim 10, wherein the results table includes a project name of each of the at least one primary project files and a project name of the one or more referenced software components.

12. The method of claim 10, wherein the reference table includes a first column listing the project ID of each of the one or more software components, and a second column listing the project ID of each of the at least one primary project file.

13. The method of claim 12, wherein the project ID of the at least one primary project file listed in the second column are in the same row as the project ID of the one or more software components that is referenced in the listed primary project file.

14. The method of claim 10, wherein the one or more software components is referenced in a plurality of primary project files.

* * * * *